2,763,631
Patented Sept. 18, 1956

2,763,631

ACRYLONITRILE POLYMERS CONTAINING VINYL CHLORIDE OR VINYLIDENE CHLORIDE

Harry W. Coover, Jr., and Joseph B. Dickey, Kingsport, Tenn., assignors to Eastman Kodak Company, Rochester, N. Y., a corporation of New Jersey No Drawing. Application May 23, 1952,
Serial No. 289,658

4 Claims. (Cl. 260—45.5)

This invention relates to resinous flame resistant acrylonitrile polymers comprising a major portion of acrylonitrile and a minor portion of vinyl chloride or vinylidene chloride, and to a process for preparing these polymers.

It is known that polyacrylonitrile fibers can be spun which have certain highly desirable physical properties such as high strength, high sticking temperature and good resistance to shrinkage at elevated temperatures. These properties make polyacrylonitrile fibers desirable for many commercial and textile applications. However, they would find much broader applications if the polyacrylonitrile fibers had improved flame resistance.

It is also known that greatly increased flame resistance of acrylonitrile fibers can be obtained by copolymerizing acrylonitrile with certain other monomers such as vinyl chloride and vinylidene chloride. The degree of improvement in this property varies with the type and amount of modifier copolymerized with the acrylonitrile. When an amount of modifier has been copolymerized with acrylonitrile sufficient to give a desirable improvement in flame resistance, it is usually found that the resulting fibers have such low sticking temperatures and high shrinkage at elevated temperatures that they are not suitable for most textile purposes. For example, when acrylonitrile is copolymerized with from 20 to 40 per cent by weight of vinyl chloride or vinylidene chloride, the resulting fibers show improved flame resistance, but their sticking temperature is below 150° C. and they shrink a considerable amount in length in boiling water. On the other hand, polyacrylonitrile fibers with no modifier have a sticking temperature of 200° C. or higher and they shrink only about 5 per cent in boiling water. While the amount of reduction in sticking temperature and the increase in shrinkage at elevated temperatures of fibers obtained from copolymers of the above kind will vary somewhat with the amount of modifier, the loss of these two desirable properties of polyacrylonitrile fibers by copolymerization as always substantial.

The simple process of mixing polymers of vinyl chloride or vinylidene chloride with polyacrylonitrile in a common solvent likewise does not produce good quality, flame resistant fibers. Such polymer mixtures are incompatible and present many difficulties in the spinning of these solutions into fibers. For example, the solutions must be spun into fibers before the operation has progressed to the point where immiscible droplets become large or the resultant fibers show segmentation defects. Obviously such incompatible solutions are not adaptable for large scale spinning operations.

We have now made the important discovery that by polymerizing acrylonitrile in the presence of an aqueous emulsion (fine dispersion) of "live" polymer of vinyl chloride or vinylidene chloride, i. e., a polymer completely polymerized but not isolated from its polymerization mixture and containing residual valencies to which the acrylonitrile becomes grafted on further polymerization, the resultant acrylonitrile polymer is a linear polymer wherein the acrylonitrile is combined inseparably to the vinyl chloride or vinylidene polymer and which exhibits properties differing from and in many respects, especially for fiber forming purposes, is superior to copolymers of vinyl chloride or vinylidene chloride with acrylonitrile, or to mechanical mixtures of their separate polymers, or to polyacrylonitrile per se. Our new acrylonitrile polymers are readily soluble in known solvents for polyacrylonitrile to give clear, stable and homogeneous solutions. Further, we have found that when fibers are spun from such solutions, they not only have retained all of the desirable properties of polyacrylonitrile fibers, but have the added advantage of considerably improved flame resistance.

It is, accordingly, an object of the invention to provide resinous, flame resistant acrylonitrile polymers. Another object is to provide stable, homogeneous solutions of these resinous polymers, and fibers prepared from these solutions. Another object is to provide methods for preparing the same. Other objects will become apparent hereinafter.

In accordance with our invention, we prepare the new resinous acrylonitrile polymers and compositions of the invention by the steps of (1) first completely polymerizing vinyl chloride or vinylidene chloride or mixtures thereof, in aqueous emulsion or finely dispersed form; in the presence of a polymerization catalyst, until the polymerization reaction is complete and (2) adding at once (not stepwise) the desired amount of acrylonitrile together with additional catalyst to the polymerization mixture containing the vinyl or vinylidene chloride in polymerized emulsion form, and continuing the polymerization reaction to completion, followed by isolating the precipitated acrylonitrile polymeric product. The proportions of components can be varied within certain definite limits, i. e., from 60–95 parts by weight of acrylonitrile and from 40 to 5 parts by weight of vinyl chloride or vinylidene chloride. However, for fiber forming purposes satisfactory acrylonitrile polymers are not obtainable by our process when the vinyl chloride or vinylidene chloride content substantially exceeds 30 parts by weight of the polymer. On the other hand, polymers containing as little as 5 parts by weight of these unsaturated halides show markedly improved flame resistance over polyacrylonitrile, and also give excellent fibers. Accordingly, the preferred acrylonitrile polymers of our invention contain from 70 to 95 parts by weight of acrylonitrile and from 30 to 5 parts by weight of vinyl chloride or vinylidene chloride or both. Certain specific compositions of our invention may contain, in addition, another ethenoid compound from a select group consisting of alkyl acrylates wherein the alkyl group contains 1 to 4 carbon atoms, (e. g. methyl, ethyl, propyl and butyl acrylates), vinyl carboxylates wherein the carboxylate group is the radical of a saturated fatty acid containing from 2 to 4 carbon atoms (e. g. vinyl acetate, vinyl propionate, vinyl butyrate, etc.) or isopropenyl carboxylates wherein the carboxylate group is the radical of a saturated fatty acid containing from 2 to 4 carbon atoms (e. g. ispropenyl acetate, isopropenyl propionate, etc.). These additional components can be introduced into the polymer by copolymerizing with the vinyl chloride or the vinylidene chloride. In any event, the resultant acrylonitrile polymer will contain broadly a minimum of 60 parts by weight of acrylonitrile and at least 5 parts by weight of vinyl chloride or vinylidene chloride, and more specifically for fiber forming purposes a minimum of 70 parts by weight of acrylonitrile and at least 5 parts by weight of the vinyl chloride or the vinylidene chloride. The proportions of the components contained in the resultant acrylonitrile polymers of our invention are approximately the same as the proportions employed in our polymerization procedure.

The polymerizations for preparing our new resinous acrylonitrile polymers can be carried out at reduced or increased pressures but preferably at normal atmospheric pressures, and are accelerated by heat, actinic light and polymerization catalysts. Typical catalysts which are useful include the organic and inorganic peroxides such as hydrogen peroxide, benzoyl peroxide, acetyl peroxide, laurayl peroxide, etc., persulfates such as ammonium persulfate and alkali metal persulfates such as sodium or potassium persulfates, etc., perborates such as ammonium perborate and alkali metal perborates such as sodium or potassium perborates, etc., percarbonates such as ammonium percarbonate and alkali metal percarbonates such as sodium or potassium percarbonates, etc. Other polymerization catalysts such as organic hydroperoxides, triethyl phosphite, tertiary amines, etc. can also be employed. A water-soluble catalyst such as the persulfates is preferred. Mixtures of catalyst can be employed. The amount of such catalysts used can be varied from about 0.003 to 5.0 per cent by weight, based on the weight of materials to be polymerized. As previously indicated, an amount of polymerization catalyst within the above limits is employed in both polymerization steps of our process, preferably 1 per cent or more in the polymerization step with the acrylonitrile. An activating agent containing the group =S=O such as an alkali metal bisulfite (e. g. sodium bisulfite, potassium bisulfite, etc.) is preferably added to either of the polymerization steps in an amount within the above limits set forth for the oxidation catalysts. Also a chain regulator can be employed, if desired, such as hexyl, octyl, lauryl, dodecyl mercaptans, etc.

The temperatures employed for the two polymerization steps can vary from about 0° to 60° C., but preferably from 30° to 50° C. The time required is not critical just so that each step of polymerization is carried to completion. Advantageously, an emulsifying agent is employed in the first step of polymerization to disperse the monomeric vinyl chloride and vinylidene chloride in water medium and to maintain the polymers formed in finely dispersed condition for subsequent graft polymerization with the acrylonitrile. Suitable emulsifying agents include alkali metal salts of fatty alcohol sulfates (e. g. sodium octyl sulfate, sodium lauryl sulfate, etc.), alkali metal salts of aromatic sulfonic acids (e. g. sodium isobutyl naphthalene sulfonate, etc.), sulfosuccinic acid esters, their alkali metal salts or amine addition salts, alkali metal salts of fatty acids containing from 12 to 20 carbon atoms, sulfonated fatty acid amides or their alkali metal salts, and the like. The emulsifying agents are used in small amount not exceeding about 2 per cent, based on the total weight of the reactants. The ratio of water to the reactants can vary from by weight from about 10:1 to 2:1, but preferably from 10:1 to 5:1.

The following examples will serve to further illustrate the resinous acrylonitrile polymers of the invention, and the manner of their preparation.

*Example 1*

2 g. of vinyl chloride were added to 80 cc. of water along with 0.02 g. of potassium persulfate and 0.02 g. of sodium bisulfite and 2 g. of the sodium salt of 2-ethylhexyl sulfate and the mixture allowed to polymerize at 35° C. over a period of 16 hours. The vinyl chloride was completely polymerized to the homopolymer. Then, 8 g. of acrylonitrile, 0.1 g. of potassium persulfate and 0.1 g. of sodium bisulfite were added to the polymerization mixture containing the polyvinyl chloride in emulsion form and the whole allowed to polymerize for 8 hours more at 35° C. The precipitated polymer was isolated by filtration and washing to give 9.2 g. of dried acrylonitrile polymer. Analysis showed that the polymer contained 20 per cent by weight of vinyl chloride, the remainder being acrylonitrile. It was homogeneously soluble in dimethylacetamide and in dimethylformamide, and had a softening point above 200 C. and fibers spun from its solutions showed greatly improved flame resistance over polyacrylonitrile fibers.

*Example 2*

2 g. of vinylidene chloride were added to 50 cc. of water containing 0.05 g. of ammonium persulfate and 2 g. of potassium laurate. The resulting emulsion was heated at 50° C. for 16 hours. The emulsion of completely polymerized vinylidene chloride was cooled and 8 g. of acrylonitrile, 0.1 g. of ammonium persulfate and 0.1 g. of sodium bisulfite were added. Polymerization was completed after allowing the mixture to stand at 30° C. for 12 hours. The resultant acrylonitrile polymer contained 19 per cent by weight of vinylidene chloride, the remainder being acrylonitrile. It had a sticking temperature above 200° C. and formed stable, homogeneous solutions in solvents such as gamma-valerolactone, dimethylformamide and dimethylacetamide.

*Example 3*

1 g. of vinyl chloride and 2 g. of vinylidene chloride were added to 60 cc. of water containing 0.1 g. of ammonium persulfate and 2 g. of the sodium salt of lauryl sulfate. The emulsion which formed was heated at 50° C. for 12 hours to complete the copolymerization. A sample taken for analysis indicated that the copolymer contained approximately 33 per cent by weight of vinyl chloride. Then, 7 g. of acrylonitrile, 0.1 g. of ammonium persulfate and 0.1 g. of sodium bisulfite were added to the polymerization mixture containing the copolymer. Polymerization of the mixture was continued by heating at 35° C. for an additional 8 hours. The resultant polymer precipitated out of solution and after washing and drying was found to contain a total of approximately 31 per cent by weight of vinyl chloride plus vinylidene chloride, the remainder being acrylonitrile. The acrylonitrile polymer had a softening above 200° C. and was soluble to stable, homogeneous solutions in solvents such as dimethylformamide and dimethylacetamide from which solutions excellent quality, flame resistant fibers were spun.

*Example 4*

2.5 g. of vinylidene chloride and 0.5 g. of methyl acrylate were added to 60 cc. of water containing 0.01 g. of ammonium persulfate and 2 g. of sodium 2-ethylhexyl sulfate. The resulting emulsion was heated at 50° C. for 12 hours to give a completely polymerized copolymer of vinylidene chloride and methyl acrylate. Then, 7 g. of acrylonitrile, 0.1 g. of ammonium persulfate and 0.1 g. of sodium bisulfite were added and the polymerization continued by heating at 35° C. for 8 hours longer. The resultant precipitated acrylonitrile polymer was obtained in a 90 per cent theoretical yield. It contained approximately 25 per cent by weight of vinylidene chloride and 5 per cent of methyl acrylate, the remainder being acrylonitrile. It had a softening point above 200° C. and was soluble in dimethylformamide and in dimethylacetamide to clear, stable and homogeneous solutions, which on spinning gave fibers of good flexibility and toughness and having greatly improved flame resistance over polyacrylonitrile fibers.

The spinning of fibers from the solutions or dopes of the resinous acrylonitrile polymers described in the preceding examples can be carried out by the usual wet or dry spinning methods wherein the solution or dope is extruded into aqueous baths or organic liquids or into heated atmospheres, the filaments formed being collected on a spool in the cabinet and the yarn rafted several hunderd per cent or more in a heated chamber. Suitable solvents for preparing the solutions or dopes includes one or more solvents such as dimethylformamide, dimethylacetamide, gamma-butyrolactone, ethylene carbonate, N-methyl-2-pyrrolidone, and similar solvents for polyacrylonitrile. The resinous acrylonitrile polymers of the invention are also useful in the preparation of sheets, films, tapes, etc., with or without the presence of added materials such as fillers, dyes, plasticizers, etc.

What we claim is:

1. A process for preparing a resinous binary acrylonitrile polymer comprising the steps of (1) heating from 30 to 5 parts by weight of vinylidene chloride, in aqueous dispersion, in the presence of a peroxide polymerization catalyst, until the polymerization reaction is complete and (2) adding at once from 70 to 95 parts by weight of acrylonitrile and an additional amount of the peroxide polymerization catalyst, and heating the reaction mixture until the polymerization reaction is complete.

2. A process for preparing a resinous binary acrylonitrile polymer comprising the steps of (1) heating from 30 to 5 parts by weight of vinylidene chloride, in aqueous dispersion, in the presence of a persulfate polymerization catalyst, until the polymerization reaction is complete and (2) adding at once from 70–95 parts by weight of acrylonitrile and an additional amount of the persulfate polymerization catalyst, and heating the reaction mixture until the polymerization reaction is complete.

3. The resinous acrylonitrile polymer obtained in claim 1.

4. The resinous acrylonitrile polymer obtained in claim 2.

References Cited in the file of this patent

UNITED STATES PATENTS

| Number | Name | Date |
|---|---|---|
| 2,420,330 | Schriver et al. | May 13, 1947 |
| 2,538,779 | Harrison et al. | Jan. 23, 1951 |
| 2,569,767 | Knock | Oct. 2, 1951 |
| 2,614,089 | Harrison et al. | Oct. 14, 1952 |
| 2,620,324 | Coover et al. | Dec. 2, 1952 |
| 2,657,191 | Coover et al. | Oct. 27, 1953 |

FOREIGN PATENTS

| Number | Country | Date |
|---|---|---|
| 627,265 | Great Britain | Aug. 4, 1949 |
| 679,562 | Great Britain | Sept. 17, 1952 |
| 999,594 | France | Oct. 3, 1951 |